(12) United States Patent
Kang et al.

(10) Patent No.: US 11,739,960 B2
(45) Date of Patent: Aug. 29, 2023

(54) AIR PURIFIER AND AIR PURIFYING SYSTEM

(71) Applicants: LG ELECTRONICS INC., Seoul (KR); CHUNGANG UNIVERSITY INDUSTRY ACADEMIC COOPERATION FOUNDATION, Seoul (KR)

(72) Inventors: Jiyoung Kang, Seoul (KR); Haeyoong Chung, Seoul (KR); Jongkeon Jeon, Seoul (KR); David Kangseong Lee, Seoul (KR); Daeyoung Kwak, Seoul (KR); Sohee Park, Seoul (KR)

(73) Assignees: LG ELECTRONICS INC., Seoul (KR); CHUNGANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 732 days.

(21) Appl. No.: 16/821,806

(22) Filed: Mar. 17, 2020

(65) Prior Publication Data
US 2020/0298158 A1  Sep. 24, 2020

(30) Foreign Application Priority Data

Mar. 19, 2019 (KR) .................. 10-2019-0031449
Jul. 29, 2019 (KR) .................. 10-2019-0091545

(51) Int. Cl.
*B01D 46/24* (2006.01)
*B01D 46/58* (2022.01)
(Continued)

(52) U.S. Cl.
CPC ............ *F24F 8/80* (2021.01); *B01D 46/0004* (2013.01); *B01D 46/24* (2013.01);
(Continued)

(58) Field of Classification Search
CPC .... B01D 46/24; B01D 46/4227; B01D 46/58; B01D 46/2411; B01D 2273/30; F24F 1/0073; F24F 8/10; F24F 8/80
(Continued)

(56) References Cited

U.S. PATENT DOCUMENTS 6,466,737 B1  10/2002 Birdsell et al.
6,623,350 B2 *  9/2003 Goupil, Jr ............ B60H 3/0616
454/158
(Continued)

FOREIGN PATENT DOCUMENTS

AU  2017255209  12/2018
CN  1651827  8/2005
(Continued)

OTHER PUBLICATIONS

European Search Report dated Aug. 14, 2020 issued in Application No. 20164334.3.
(Continued)

*Primary Examiner* — Minh Chau T Pham
(74) *Attorney, Agent, or Firm* — Ked & Associates, LLP

(57) ABSTRACT

An air cleaning or purifying system includes a main air cleaner or purifier having an upper seating surface that is at least partially flat and at least one portable air purifier having a base configured to be seated on re lifted from the upper seating surface. The main air purifier and the portable air purifier may each have a filter and a fan. The air main and portable air purifiers may operate together. The portable air purifier may be moved to another room, or may be seated on the main air purifier such that various combinations of air purifying modes and air purifying capacities may be performed.

20 Claims, 10 Drawing Sheets

(51) Int. Cl.
  *F24F 8/10* (2021.01)
  *F24F 8/80* (2021.01)
  *F24F 1/0071* (2019.01)
  *F24F 1/0073* (2019.01)
  *B01D 46/00* (2022.01)
  *B01D 46/42* (2006.01)
  *F24F 8/108* (2021.01)

(52) U.S. Cl.
  CPC ......... *B01D 46/4227* (2013.01); *B01D 46/58* (2022.01); *F24F 1/0073* (2019.02); *F24F 8/108* (2021.01); *B01D 2267/30* (2013.01); *B01D 2279/50* (2013.01); *F24F 2221/12* (2013.01)

(58) Field of Classification Search
  USPC .............................................. 55/385.1, 385.3
  See application file for complete search history.

(56) References Cited

U.S. PATENT DOCUMENTS

| | | | |
|---|---|---|---|
| 7,846,227 B2* | 12/2010 | Gotoh | A61L 9/22 |
| | | | 361/231 |
| 10,377,347 B2* | 8/2019 | Sawyer | B60H 1/00564 |
| 10,518,205 B2* | 12/2019 | Mun | F24F 13/20 |
| 10,682,895 B2* | 6/2020 | Mathiasson | B60H 3/0658 |
| 10,684,027 B2* | 6/2020 | Goswami | F24F 8/10 |
| 10,697,665 B2* | 6/2020 | Jung | F24F 8/108 |
| 10,898,850 B2* | 1/2021 | Matsumoto | B60H 3/0633 |
| 11,006,797 B1* | 5/2021 | Cho | A47L 9/106 |
| 11,247,160 B2* | 2/2022 | Chen | B01D 46/0005 |
| 2003/0024218 A1 | 2/2003 | Stephens et al. | |
| 2005/0172816 A1 | 8/2005 | Son et al. | |
| 2014/0020561 A1 | 1/2014 | Aery et al. | |
| 2015/0375602 A1* | 12/2015 | Fields | B60H 1/00264 |
| | | | 55/385.3 |
| 2018/0299899 A1 | 10/2018 | Suvama | |
| 2019/0021568 A1 | 1/2019 | Kim | |
| 2019/0056126 A1 | 2/2019 | Law et al. | |
| 2019/0276241 A1 | 9/2019 | Royce | |
| 2020/0030736 A1 | 1/2020 | Yun | |
| 2022/0122397 A1 | 4/2022 | Cristache | |

FOREIGN PATENT DOCUMENTS

| | | |
|---|---|---|
| CN | 1752617 | 3/2006 |
| CN | 1291684 | 12/2006 |
| CN | 201251250 | 6/2009 |
| CN | 204858756 | 12/2015 |
| CN | 105333528 | 2/2016 |
| CN | 105757817 | 7/2016 |
| CN | 107042040 | 8/2017 |
| CN | 107270391 | 10/2017 |
| CN | 107401803 | 11/2017 |
| CN | 206669923 | 11/2017 |
| CN | 107575944 | 1/2018 |
| CN | 107728484 | 2/2018 |
| CN | 108180616 | 6/2018 |
| CN | 108895538 | 11/2018 |
| CN | 208579441 | 3/2019 |
| EP | 3127462 | 2/2017 |
| EP | 3211343 | 8/2017 |
| JP | H04-103925 | 4/1992 |
| KR | 10-2008-0051976 | 6/2008 |
| KR | 10-2009-0114028 | 11/2009 |
| KR | 10-1698045 | 1/2017 |
| KR | 10-2017-0044553 | 4/2017 |
| WO | WO 2004/108248 | 12/2004 |

OTHER PUBLICATIONS

Chinese Office Action dated Jun. 3, 2021 issued in Application No. 202010190947.9.
Chinese Office Action issued in Application No. 2021052802933920 dated Jun. 2, 2021.
European Search Report dated Aug. 12, 2020 issued in Application No. 20163818.6.
Chinese Office Action issued in Application No. 202010182206.6 dated Mar. 31, 2021.
European Search Report dated Aug. 20, 2020 issued in Application No. 20164348.3.
U.S. Appl. No. 16/821,737, filed Mar. 17, 2020.
U.S. Appl. No. 16/821,806, filed Mar. 17, 2020.
U.S. Appl. No. 16/821,871, filed Mar. 17, 2020.
U.S. Office Action issued in U.S. Appl. No. 16/821,871 dated Apr. 26, 2022.

* cited by examiner

AIR PURIFIER AND AIR PURIFYING SYSTEM

CROSS-REFERENCE TO RELATED APPLICATION(S)

This application claims priority under 35 U.S.C. § 119 to Korean Application Nos. 10-2019-0031449 filed on Mar. 19, 2019, and 10-2019-0091545 filed on Jul. 29, 2019, whose entire disclosures are hereby incorporated by reference.

BACKGROUND

1. Field

The present disclosure relates to an air purifier and an air purifying system.

2. Background

An air cleaner or purifier may be a device that suctions contaminated air, filters or purifies the contaminated air, then discharges the purified air. For example, an air purifier may include an air blowing device or fan to introduce outside air into an interior of the air cleaner and a filter to filter dust, germs, and other foreign matter (hereinafter "foreign matter") from the air. Generally, an air purifier may be configured to purify an interior space or room such as a home or office.

An air purifier may be manufactured in a predetermined size and shape according to a predetermined design and supplied to the market. A consumer may purchase an air purifier that approximately matches a size and air cleaning capacity desired. However, due to a lack of customization, it may be difficult for a consumer to purchase an air cleaner that is suited to his or her particular residential environment, which may include a plurality of indoor rooms having various shapes, sizes, and air quality. It may be especially difficult for customers to gauge which air purifier to purchase for an atypical room having an unusual shape or design.

WO 2004/00108248 A2 discloses a modular air purification system capable of modularizing or customizing a filter member in response to an installation environment of an air purifier, but this modularizing must be done only by an expert, and cannot be performed by a general user.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
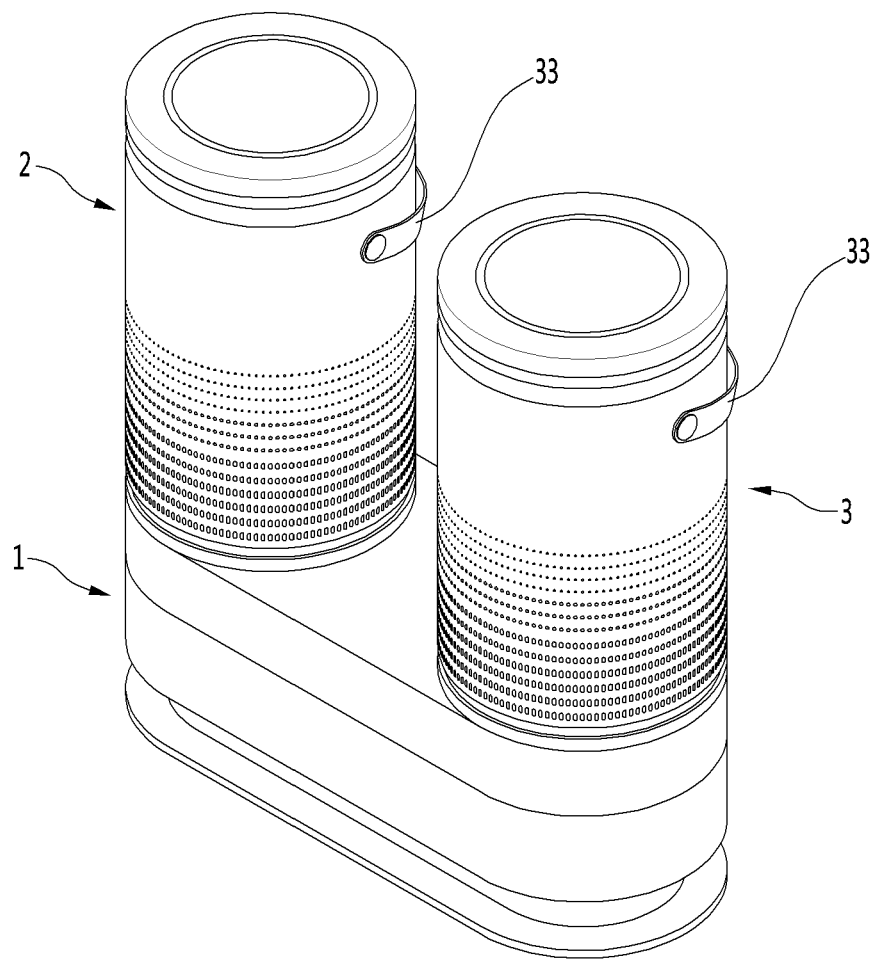
FIG. 1 is a perspective view of an air cleaning or purifying system according to an embodiment.

Referring to FIG. 1, an air cleaning or purifying system may include at least two portable or mobile air purifiers or cleaners 2 and 3 and a base or cradle 1 on which the two portable air purifiers 2 and 3 may be seated on and lifted and removed from. The portable air purifiers 2 and 3 may be independently operated or controlled. The base 1 may also be referred to as a docking station. The base 1 may not only seat the at least two air purifiers 2 and 3 but may also optionally function as an additional air purifier. Although embodiments disclosed herein are not limited to a base 1 functioning as an air purifier 1 and the base 1 may simply serve as a docking station, for convenience of description, an embodiment where the base 1 is also an air purifier will be described herein. The base 1 will hereinafter be referred to as a base or main air purifier 1.

The base air purifier 1 may be a fixed or stationary air purifier 1 configured to remain in a certain position or space, while the portable air purifiers 2 and 3 may be picked up and moved to separate locations. However, the base air purifier 1 may also be moved and adjusted. The portable air purifiers 2 and 3 may have a smaller size and weigh less than the base air purifier 1 and include handles 33, so the portable air purifiers 2 and 3 may be easier to carry and move than the base air purifier 1. Alternatively, the base air purifier 1 may be installed or fixed to a floor or wall so as to be more stationary.

The portable air purifiers 2 and 3 may be supplied with energy and/or charged when seated in the base air purifier 1. The handle 33 may be provided on an upper portion of the portable air purifier 2, 3 for convenient movement of the portable air purifier 2, 3.

The base air purifier 1 may be placed in a large and/or dirty room (e.g., a living room or family room), as the base air purifier 1 may have a higher air cleaning or purifying capacity than the portable air purifiers 2 and 3. The living room and/or family room may be a space in which the user spends a lot of time and may be the widest among the various indoor rooms in a house or apartment, and therefore may require the strongest air purifying action due to a large number of people and/or frequency of occupancy of the room.

The portable air purifier 1 may be used in a smaller, cleaner, and/or specialized space such as a kitchen, study, office, closet, bedroom, bathroom, etc. The kitchen or study, for example, may be a more closed space than other rooms.

When an intensive and efficient air purifying operation is required, the portable air purifiers 2 and 3 may be seated on the base air purifier 1, and the base and portable air purifiers 1, 2, and 3 may all work in the same room. In this case, a quick and efficient air purifying operation may be performed.

An air purifying or cleaning capacity per unit time of the base air purifier 1 as compared with air purifying or cleaning capacities of the portable air purifiers 2 and 3 may have a ratio similar to 4:3:3. The air purifying capacity of the entire air purifying system may be 100% of a total air cleaning or purifying capacity, with the base air purifier 1 responsible for 40% of the total air purifying capacity and each portable air purifier 2, 3 responsible for 30%.

The air purifying capacity may not depend on a three-dimensional size of the indoor space. The air purifying capacity may be predetermined in consideration of a three-dimensional size of an indoor space where the air purifier 1, 2, or 3 is likely to be provided or based on predetermined or anticipated operating modes of the base air purifier 1 and the portable air purifiers 2 and 3.

The base air purifier 1 may be provided in a laterally long shape that extends in a horizontal direction. A first portable air purifier 2 may be seated on a first (e.g., left) side of the base air purifier 1 and a second portable air purifier 3 may be seated on a second (e.g., right) side of the base air purifier 1.

A handle 33 may be provided on an upper portion of each portable air purifier 2, 3, and a user may move or carry the portable air purifier 2, 3, by holding the handle 33. The handle 33 may be hinged to an upper side surface of the portable air purifier 2,3 by a hinge structure, and may be rotatable over a top of the air purifier 2, 3. A position of the handle 33 may be configured so as not to interfere with side discharge or suction holes formed in a lower side surface of the portable air purifier 2, 3.

Figure 2:
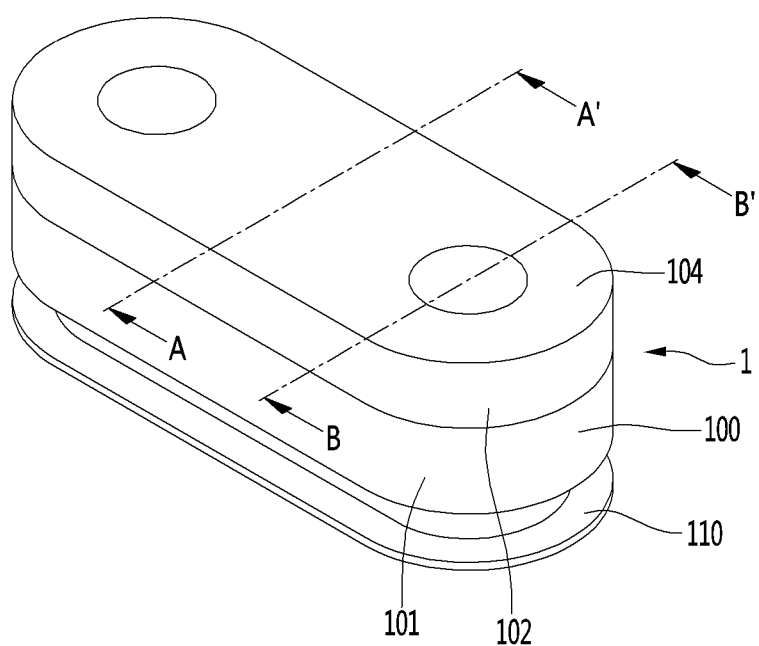
FIG. 2 is a perspective view of a base or main air cleaner or purifier.

Referring to FIG. 2, the base air purifier 1 may have an outer wall 100 that extends horizontally and forms an exterior of the base air purifier 1. The outer wall 100 may have a predetermined height and have an elliptical shaped or stadium shaped horizontal cross-section. A stadium shape may mean a shape similar to an elliptical where long sides are straight; such as two demi-circles connected by straight lines or a rectangle shape having rounded corners. An inlet or suction port 110 may be formed at a lower portion of the outer wall 100. An upper seating surface 104 may form an upper or top surface of the base air purifier 1, and may be configured to receive the portable air purifiers 2 and 3. At least a portion of the upper seating surface 104 may be flat. For example, an area outside where the portable air purifiers 2 and 3 may be flat. A surface over which the portable air purifiers 2 and 3 are seated may also be flat.

The outer wall 100 may be provided longer in a length or horizontal (i.e., left and right) direction than in a width (i.e., front and rear) direction and also than in a height (i.e., up and down) direction. For example, the length of the outer wall 100 in the left-right direction may be 3 times or 4 times (e.g., 4.2 times) longer than the height in the vertical direction (not including the base 103) and 2 times or 3 times (e.g., 2.5 times) longer than the width in the front-rear direction. When including the base 103, the length of the outer wall 100 in the left-right direction may be approximately 3 times longer than the height in the vertical direction. However, embodiments disclosed herein are not limited to such dimensions.

The suction port 110 may have at least one opening to an inner space formed inside the outer wall 100. At least one fan 106 (FIG. 6) may be provided inside the inner space to suction air through the suction port 110. A plurality of fans may be provided in the inner space. As an example, a first fan may be provided on a left side of the inner space and a right fan may be provided on a right side of the inner space. However, embodiments disclosed herein are not limited to two fans. For example, a third fan may be provided in a center of the inner space.

The outer wall 100 may be divided into a closed or non-pourous wall or region 101 and a discharge wall or region 102, which may have a plurality of holes or openings. The closed wall 101 may be a region or area through which air may not flow directly, and the discharge wall 102 may be a region or area where air from the inner space may be discharged to an outside of the base air purifier 1. The closed wall 101 may be provided between the discharge wall 102 and the suction port 110, and may provide a sufficient distance between the discharge wall 102 and the suction port 110 to prevent or reduce air discharged out of the discharge wall 102 from flowing back to the suction port 110, especially since clean air discharged through the discharge wall 102 may have a low flow velocity.

The base air purifier 1 may be placed in a large room (e.g., living room or family room) and may be operated in a windless or quiet mode, which may be implemented in a 24 hour or non-stop state. In the windless mode, the base air purifier 1 may be operated at a low suction or fan rate having low noise, so a user in the living room, for example, may not be annoyed by or notice an operation of the base air purifier 1. Details of the windless mode will be described later.

Figure 3:
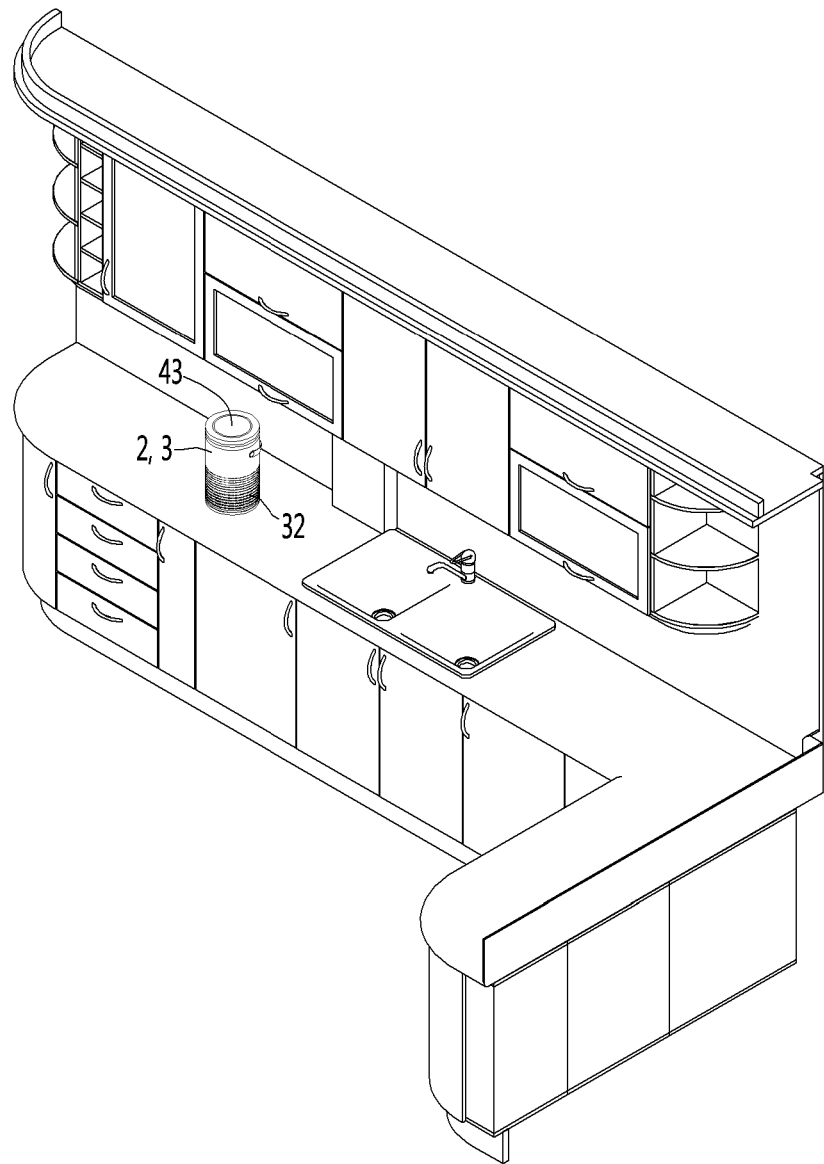
FIG. 3 shows a portable air purifier placed in a kitchen.
Figure 4:
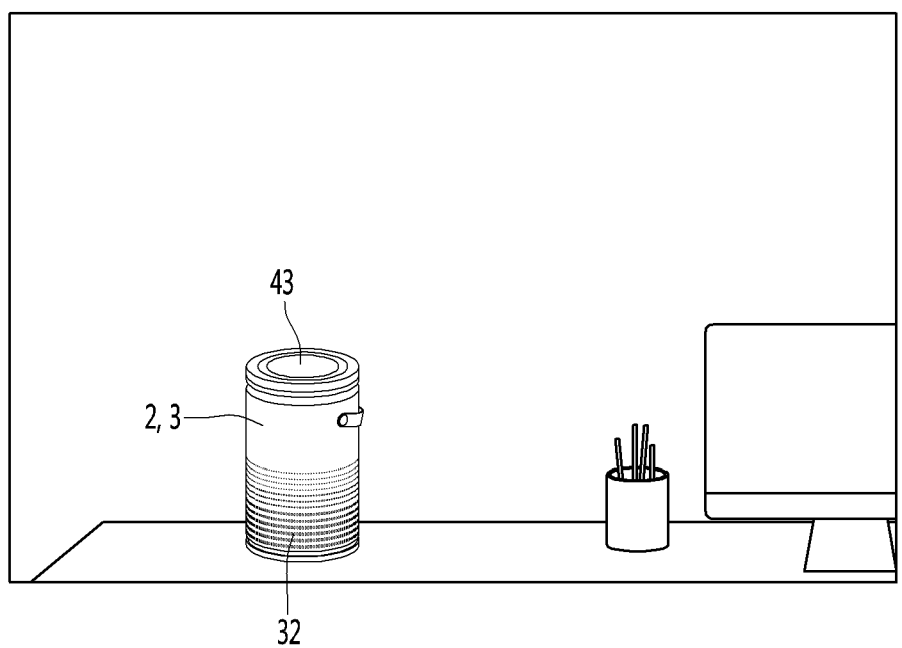
FIG. 4 shows a portable air purifier placed in a study or office.

Referring to FIGS. 3 and 4, the portable air purifiers 2 and 3 may be provided with a suction or inlet portion or wall 32 and an air guide 43 to adjust a discharge direction of clean air. The air guide 43 may be a rotatable and/or inclinable vane that is configured to move (i.e., rotate, pivot, turn, or tilt) to change a direction of the discharged air. There may be a plurality of vanes to further adjust the flow of air. A motor may drive the air guide 43 so that an adjustment may be automatic. The suction portion 32 may include a plurality of holes 34 (FIG. 5) formed in a side surface of the air purifier, and air may be suctioned through the suction portion 32. The air guide 43 may have at least one opening or hole and serve as an outlet or discharge portion. The air guide 43 may be configured to quickly change a direction of a large amount of air to guide the discharged air toward a desired direction.

The portable air purifiers 2 and 3 may quickly perform an air purifying function at a desired place. For example, as shown in FIG. 3, smoke generated in the kitchen during cooking may be suctioned into the suction portion 32 and filtered by a fan 41 (FIG. 5) inside the portable air purifier 2 or 3. Clean, filtered air filtered may be blown and dispersed into the kitchen by the air guide 43. The user may choose to configure the air guide 43 to direct air toward the stove or cooker where smoke is being generated. As another example, as shown in FIG. 4, a portable air purifier 2 or 3 may be placed in a highly polluted or dusty environment such as a study, and clean air may be quickly blown toward a user working in the study.

The user may conveniently grasp the handle 33 of the portable air purifier 2 or 3 and to transport the portable air purifier 2 or 3 to another room. The user may carry the portable air purifier 2 or 3 to or from the base air purifier 1 to seat the portable air purifier 2 or 3 on the base air purifier 1 or to remove the portable air purifier 2 or 3 from the base air purifier 1 for placement in another room at a desired position. The portable air purifiers 2 and 3 may be charged on the base air purifier 1 while seated. Alternatively or in addition thereto, the portable air purifiers 2 and 3 may be provided with a socket and terminal and/or separate plug to receive power from an external commercial power source (e.g., wall socket).

Figure 5:
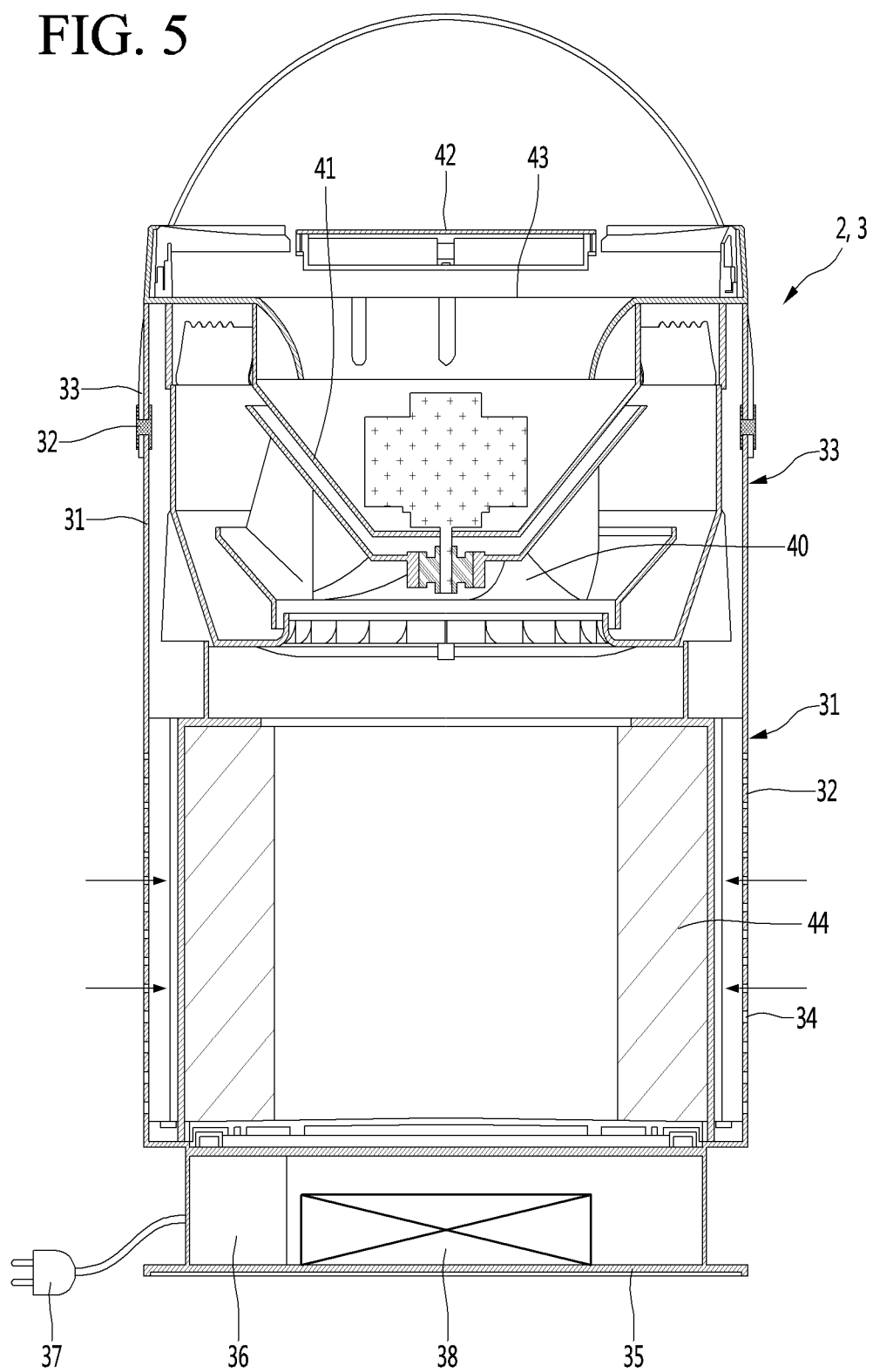
FIG. 5 is a schematic cross-sectional view of a portable air purifier.

Referring to FIG. 5, the portable air purifier 2, 3 may have a general cylindrical shape formed by an outer wall 31. A base 35 may be provided below the outer wall 31 to form a lower end of the portable air purifier 2, 3, which may be placed on a floor, the base air purifier 1, or another surface (e.g., desk).

The portable air purifier 2, 3 may suction ambient or external air from a bottom or lower portion, filter foreign matter from the suctioned air, and discharge air from out of a top or upper portion. The suction portion 32 may have a plurality of suction holes 34 formed in a lower portion of the outer wall 31, and air may be suctioned through the plurality of holes. A closing portion or wall 39 may be formed above the suction portion 32. The closing portion 39 may be a non-porous region through which air may not directly flow.

The suction holes 34 may have a diameter of several tens of millimeters to several millimeters. Outside air may be suctioned together with foreign matter through the suction holes 34. The suctioned air and foreign matter may flow upward toward a filter assembly 44. The filter assembly 44 may include a filter to filter foreign matter from the suctioned air and a filter housing to support the filter.

A fan 41 may suction the ambient air through the suction portion 32. The fan 41 may be provided in a fan housing 40, which may be supported on the filter housing of the filter assembly 44. The air guide 43 may be arranged an inner space of the outer wall 31. Clean air discharged from the filter assembly 44 may be guided by the air guide 43.

Power may be supplied to the portable air purifier 2, 3 by a power source or a wireless charging method (e.g., a wireless power transfer or WPT method such as an electromagnetic induction method). A display 42 (e.g., a light emitting diode or liquid crystal display) may be provided on an upper surface of the portable air purifier 2, 3 to display an operating state, charging information, time information, air quality information, or other information of the portable air purifier 2, 3. Alternatively or in addition hereto, the display 42 may include a light emitting device (e.g., light emitting diode LED) and may serve as a lamp or light device to illuminate a room in which the portable air purifier 2, 3 is placed.

A wireless charging module 38 (e.g., wireless power transceiver or receiver) may be provided inside of the base 35. The wireless charging module 38 may be at or close to a bottom surface of the base 35 so as to align with and/or interact with a wireless charging module 121 of the base air purifier 1 (FIG. 7), which may be provided at an upper surface of the base air purifier 1. The portable air purifier 2, 3, may include a battery, which may store power received from the wireless charging module 38.

An interior of the base 35 may also include an accommodation or wire space 36 in which electric wires (e.g., for a plug 37) are provided and stored. The plug 37 may be plugged into a commercial external power source (e.g., wall socket) to supply power to the portable air purifier 2, 3, and/or charge a battery. Alternatively or in addition hereto, the plug 37 may be configured to insert into a universal serial bus (USB) port or other ports for power supply (e.g., mini USB, micro USB, HDMI, etc.)

The handle 33 may be provided at an upper end of the outer wall 31 so that the user may easily carry the portable air purifier 2 or 3. The handle 33 may be fixed to the outer wall 31 to be rotatable by a hinge 33a. The handle 33 may be rotated and lifted to extend over a top of the display 42 when the user uses the handle 33 and may be lowered to a side when not in use. The handle 33 may not interfere with an air flow (i.e., a suction of air through the suction portion 32 and/or a discharge of air via the air guide 43) of the portable air purifier 2, 3.

A direction of air discharged by the fan 41 may be adjusted based on a control of the air guide 43. For example, clean air may be provided at a predetermined speed directly to a user who desires clean air. The portable air purifier 2 and 3 may be referred to as a direct air blow type air purifier. The base air purifier 1 may be operated in a windless or quiet mode as described above, and may indirectly provide clean air to the user. The base air purifier 1 may be referred to as an indirect blow type air purifier.

Figure 6:
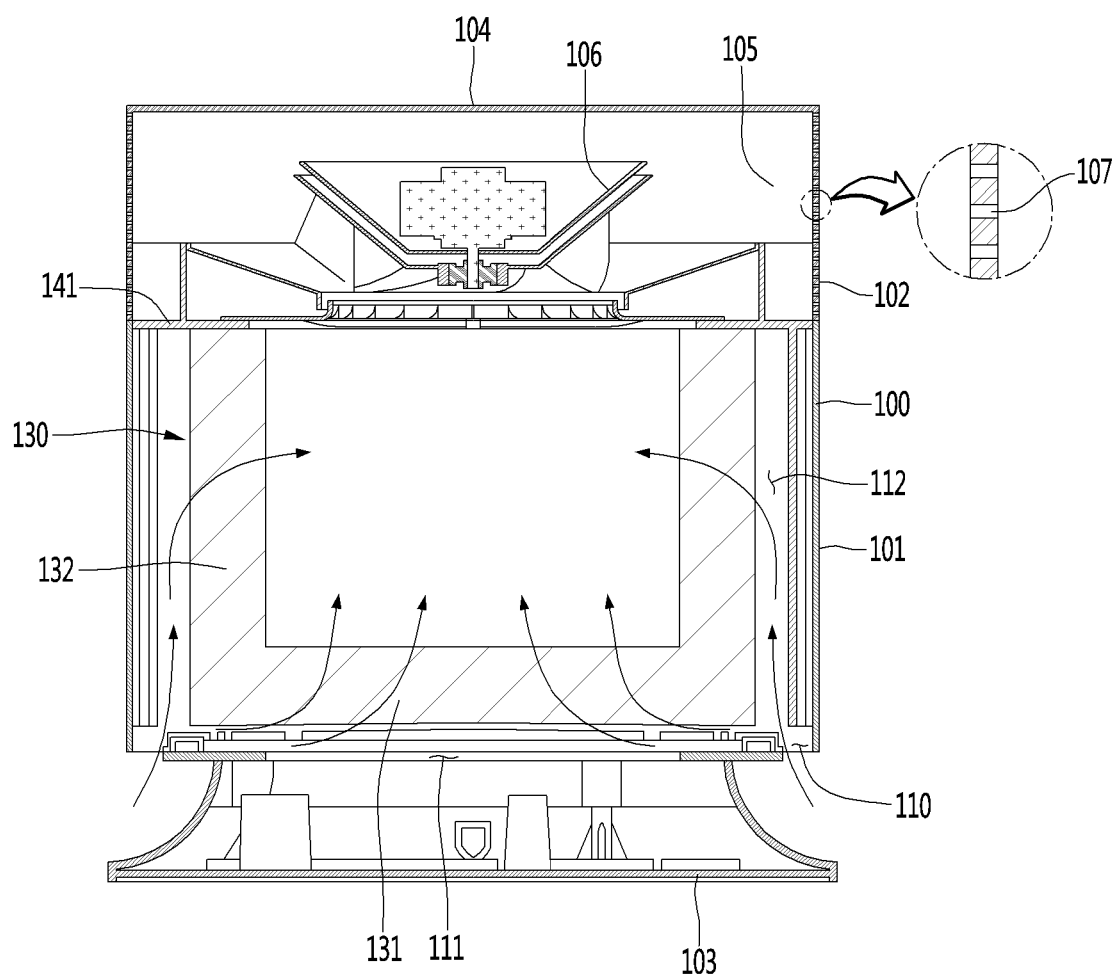
FIG. 6 is a schematic cross-sectional view of A-A' of FIG. 2.

Referring to FIG. 6, the base air purifier 1 may include the outer wall 100 extending in the vertical direction. The suction port 110 may include an opening formed at a bottom of the closed wall 101. A base 103 may be provided below the outer wall 100 and seated on a floor, ground counter, etc. The base 103 may have a concave curvature so as to have a cross-sectional area that reduces in an upward direction toward the closed wall 101 so as not to obstruct the suction port 110. Contaminated air may be guided in a space between the base 103 and the outer wall 100 to flow through the suction port 110.

The air suctioned through the suction port 110 at a bottom of the closing wall 101 may be guided to a filter 130, and clean air passed through the filter 130 may be discharged out of the discharge wall 102. The filter 130 may include a lower or bottom surface 131 and a side surface 132. Air introduced through the suction port 110 may be suctioned into a first suction passage 112 provided at a side of the side surface 132 and a second suction passage 111 provided below the bottom surface 131 of the filter 130. The side surface 132 may be cylindrical and the bottom surface may cover a bottom of the side surface 132. Air may be suctioned through the filter 130 from all radial directions and also from below in an axial direction. Since the filter 130 may have a large suction area, a resistance to air flow and noise may be reduced. In addition, more air may be filtered or purified per unit time.

The first suction passage 112 may be defined as a space between the closed wall 101 and the side surface 132 of the filter. The second suction passage 111 may be defined as a space or gap between the base 103 and the bottom surface 131 of the filter. Air may not be suctioned through the closed wall 101, and the closed wall 101 may create a distance between the suction port 110 and the discharge wall 102 so as to prevent or reduce clean discharged air from being resuctioned and refiltered, improving a filtering performance of the filter 130.

A fan 106 may suction air through the suction port 110 and discharge air through the discharge wall 102. The fan 106 may be house din a fan housing 105. The fan 106 and fan housing 105 may be provided at an outlet side of (i.e., above) the filter 130. An upper opening formed by the outer wall 100 may be closed by the upper seating surface 104. The portable air purifiers 2 and/or 3 may be placed on an upper surface of the upper seating surface 104.

The fan 106 may provide a negative pressure. Air filtered through the filter 130 may be discharged by the fan 106 to a periphery of the fan 130 (i.e., in a radial direction) toward the discharge wall 102. The discharge wall 102 may include a plurality of holes 107 (e.g., micro holes) formed therein. The air discharged by the fan 106 may be discharged through the plurality of micro holes 107 formed in the discharge wall 102.

An inner frame 141 may be provided in the outer wall 100 to extend horizontally and/or parallel to the upper seating surface 104. An upper end of the discharge wall 102 may be sealed (e.g., bonded, welded, adhered, or fused) with an edge of the upper seating surface 104, and an outer end or side of the inner frame 141 may be sealed with a lower end of the discharge wall 102 and/or an upper end of the closed wall 101. The inner frame 131 may be configured to prevent or reduce suctioned air from being discharged through the discharge wall 102 without having first passed through the filter 130. The inner frame 141 may be sealed with an inner surface of the outer wall 100 at a same or similar point where a boundary between the discharge wall 102 and the closed wall 101 is provided.

The microholes 107 may be configured to discharge clean air discharged by the fan 106 back into an indoor space at a predetermined flow rate or less. The microhole 107 may have a diameter of about 1 millimeter or less. The microholes in the drawings may be exaggerated in size for clarity. The microholes 107 may be smaller than the suction holes 34 provided in the portable air purifier 2,3, as the suction holes 34 may have a diameter in the range of several millimeters to several tens of millimeters.

At least 100,000 microholes 107 may be formed in the discharge wall 102. For example, several hundreds of thousands of microholes 107 may be provided. A size and number of microholes 107 may be configured such that a flow rate of clean air through the microhole 107 is 0.25 m/s or less (e.g., 0.15 m/s or less). Clean air discharged at such a rate may be referred to as a no-wind condition, which is difficult for the user to feel wind. Since a discharging operation may be configured to minimize a flow rate of discharged air, the base air purifier 1 may be capable of a windless or "no-wind" operation mode.

In the windless operation mode, a rotation speed of the fan 106 may be low, further reducing a flow rate of air, noise, and power consumption. The user may not be able to recognize (i.e., hear or feel) discharged air and/or fan 106 in the windless operation mode. The windless operation mode may be operated in a 24-hour air purifying mode or state in which the base air purifier 1 is continuously operated.

The base air purifier 1 may also be operated in a base driving mode that is different from the windless operation mode. In the base driving mode, the fan 106 may be rotated at a higher speed such that the flow rate of discharged air through the microhole 107 may exceed 0.25 m/s. At such a rate, the user may hear noise from the base air purifier 1 and feel air discharged toward the user, but air may be purified more quickly. The fan 106 may be driven at moderate speeds (i.e., an air purifying mode) or relatively high speeds (i.e., a rapid air purifying mode).

A control module or controller 10 (FIG. 8) of the base air purifier 1 may control a rotational speed of the fan 106. Rapid air purifying may be performed based on a sensed air quality of the room or a users preferences, while the windless mode may be performed when air quality is near perfect in order to maintain a clean state. In such a state, minimal air purifying may be required. The rotational speed of the fan 106 may be continuously increased or decreased in proportion to a sensed air quality.

A sensor 11 (FIG. 8) may be configured to sense an air quality, dust, or pollution level. The rotational speed of the fan 106 may be controlled by the controller 10 based on information received by the sensor 11. As an example, the controller 10 may store a predetermined low air quality (indicating high pollution) and a predetermined high air quality (indicating low pollution). When the sensor 11 indicates that a sensed air quality is at or below the predetermined low air quality, the controller 10 may drive the fan 106 at a predetermined high speed or higher. When the sensor 11 indicates that a sensed air quality is at or above the predetermined high air quality, the controller 10 may drive the fan 106 at a predetermined low speed or lower. As another example, the controller 10 may store a predetermined target air quality, and control the fan 106 based on how much the sensed air quality indicated by the sensor 11 is above or below the predetermined target air quality. The user may preset the predetermined target air quality and/or the predetermined high and low air qualities in the previous example.

Figure 7:
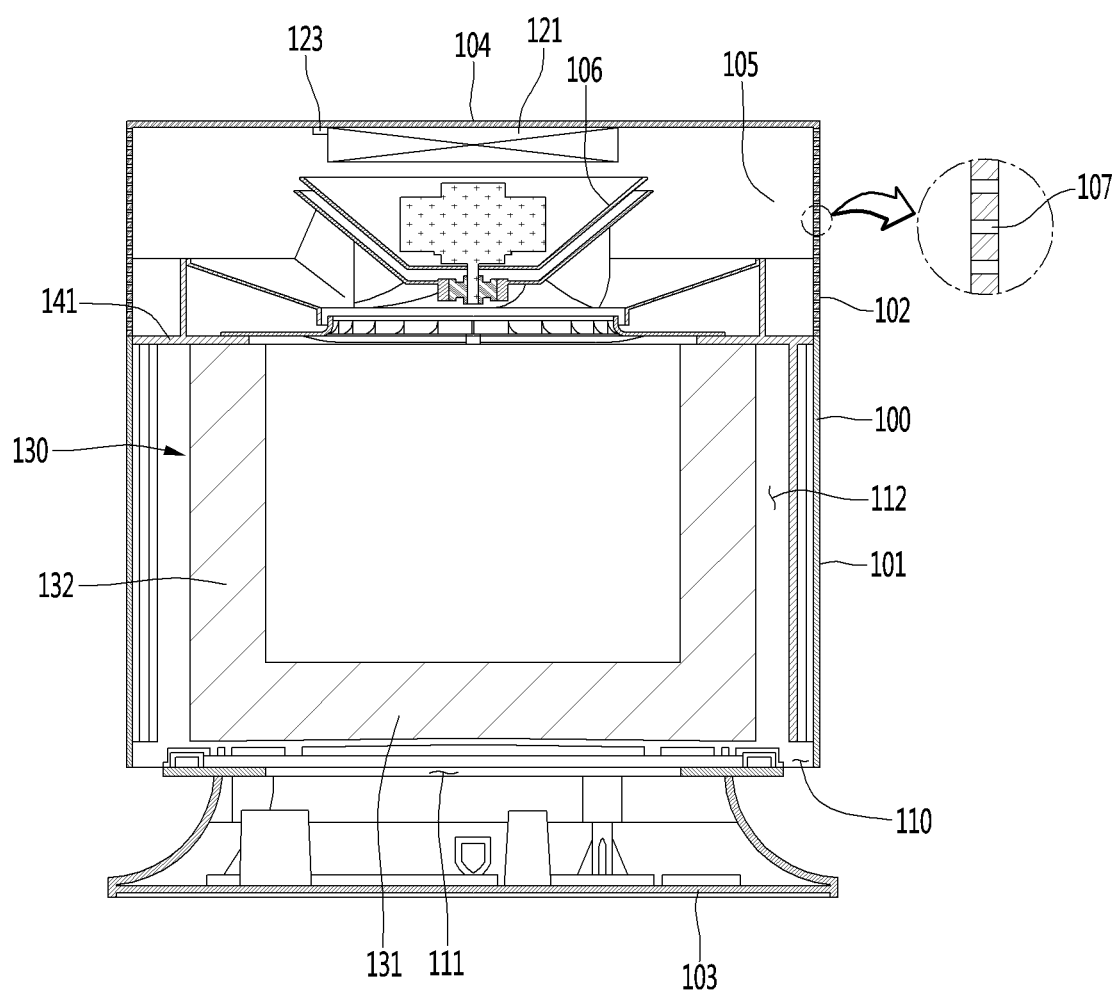
FIG. 7 is a schematic cross-sectional view of B-B' of FIG. 2.

Referring to FIG. 7, a wireless charging module 121 may be provided in an upper portion of the base air purifier 1 below or at the seating surface 104. A position of the wireless charging module 121 may correspond to a position of the wireless charging module 38 provided in the base 35 of the portable air purifier 2, 3. The wireless charging module 121 of the base air purifier 1 may extend to be under both left and right sides of the base air purifier 1 to align with the wireless charging modules 38 of the portable air purifiers 2, 3. For convenience of description, the wireless charging module 121 of the base air purifier 1 may be referred to as a first wireless charging module, and the wireless charging module 38 of the portable air purifier 2, 3 may be referred to as a second wireless charging module 38. The first wireless charging module 121 may wirelessly supply energy to the second wireless charging module 38 when the portable air purifier 2 or 3 is seated on the upper seating surface 104 of the base air purifier 1 to charge batteries of the portable air purifiers 2 and/or 3.

A seating sensor 123 may be provided at a position adjacent to the first wireless charging module 121 to detect a seating of the portable air purifier 2 or 3. The seating sensor 123 may be a Hall sensor, a light sensor, a touch sensor, etc. For example, the seating sensor 123 may be a Hall sensor, and a magnet may be provided on a bottom of the portable air purifier 2, 3. However, embodiments disclosed herein are not limited to a Hall seating sensor 123. The base air purifier 1 may include two seating sensors 123 to correspond to each portable air purifier 2 or 3. When the seating sensor 123 detects a seating of a portable air purifier 2, 3, the first and second wireless charging modules 121 and 38 may interact with each other and perform a wireless charging operation (e.g., an electromagnetic induction method via coils).

A second fan 151 and a second fan housing 152 may be provided inside the base air purifier 1. The first and second fans 106 and 151 may be provided at left and right sides, respectively, inside the base air purifier 1. Alternatively or in addition hereto, the base air purifier 1 may have three or more fans and fan housings. For example, a third fan and fan housing 1 may be provided at a center between the first and second fans 106 and 151. Such fans may operate similarly to the previously described fan 106, and may similarly be controlled by the controller 10. The filter 130 may have a size configured to extend under all fans 106. For example, the filter 130 may have an elliptical or stadium shape corresponding to an inner contour of an inner surface of the outer wall 100. Alternatively, there may be multiple filters 130 corresponding to multiple fans 106.

The second fan 151 and/or any additional fans may be operated when a strong cleaning capacity is needed (e.g., when the sensor 11 indicates very poor air quality). As an example, when a normal level of air purifying function is performed or the base air purifier 1 is operated in the windless operation mode, the first fan 106 may be operated, while the second fan 151 may be turned off. During a rapid air purifying mode, the second fan 151 and/or any additional fans may be operated together with first fan 106 for a stronger air purifying function.

Alternatively, the first, second, and any other fans 106 may be operated and controlled together to be synchronized. In the windless operation mode, for example, each of the first and second fans 106 and 151 may be operated, but at a very low rotation speed so as to reduce noise, power consumption, and a flow rate of discharged air through the microholes 107.

In a rapid air purifying mode, a flow rate of clean air passing through the microhole 107 may be high, and noise and power consumption may be increased. The rapid air purifying mode may be performed only by the first fan 106 being rotated at a very high speed, or by both first and second fans 106 and 151 at high speeds. Multiple fans may be provided to reduce a load on any single fan. In addition, when the portable air purifiers 2, 3 are seated on the base air purifier 1, fans 41 of the portable air purifiers 2, 3 may be rotated at a higher speed so as to more quickly purify air.

The 24-hour air purifying state may be implemented so that an air quality of the indoor space may be maintained at a constant level. During the 24-hour air purifying state, the air purifier may be continuously operated and adjusted to address various sensed air qualities automatically even without a command of the user.

The user may also input commands. The 24-hour air purifying mode may be performed based on the windless operation mode. When a sudden increase in air pollution is sensed, the user may be informed via the display 42 (FIG. 5) of a docked portable air purifier 2, 3 and/or via a sound, alarm, or display provided on the base air purifier 1. The display 42 of the portable air purifier 2, 3 and/or the base air purifier 1 may include a user interface (e.g., touch screen or button) in which the user may input a command, and the user may select a rapid air purifying mode. Selecting the rapid air purifying mode may operate all of the base and portable air purifiers 1, 2, and/or 3. Alternatively, the user may choose to place one of the portable air purifiers 2 in a separate room and choose a different operating mode for that particular portable air purifier 2. As another alternative, only the base air purifier 1 may be operated in the rapid air purifying mode. A number and/or combination of base and portable air purifiers 1, 2, and/or 3 operated in the rapid air purifying mode may be based on a seating of the portable air purifiers 2, 3 and/or positions of the portable air purifiers 2, 3.

In the 24-hour air purifying state in a windless mode, a rotation speed of the fans 106 may be minimized so that a slight amount of air purifying is always performed. In the 24-hour air purifying state in a windless mode, all light emitting devices of the base air purifier 1 may be turned off. When a poor air quality is detected, at least one of the fans 106 and/or 41 of the base or portable air purifiers 1, 2, 3 may be driven at a higher speed until the air quality returns to a predetermined target air quality or predetermined target air quality range. Once air quality returns to the predetermined target air quality range, the fans 106 and/or 41 are stopped, driven at a lower speed, or driven according to a users command.

A general operation mode may be a mode that is based on the user's command. The general operation mode may be similar to the windless mode in the 24 hour state, except that a base speed of the fan 106 may be based on the user's selection instead of at a minimum speed or based on a predetermined air quality range. For example, the user may command the fan 106 to operate at a moderate speed. Alternatively or in addition thereto, when a sensed air quality falls outside of a predetermined air quality range (which may be selected by the user), the fans 106 and/or 41 may be temporarily sped up until the air quality returns to the predetermined air quality range, after which the fans 106 and/or 41 return to operating based on the user's command.

The portable air purifiers 2,3 may also be operated in the windless mode or in the general operation mode based on the users command. The user may choose different settings for each portable air purifier 2,3. In addition, each portable air purifier 2,3 may also have an air quality sensor and may respond to air quality sensed in a room where the portable air purifier 2,3 is placed. The fans 41 of the portable air purifiers 2, 3 may be driven at different speeds based on different commands selected by the user or based on different sensed air qualities.

Figure 8:
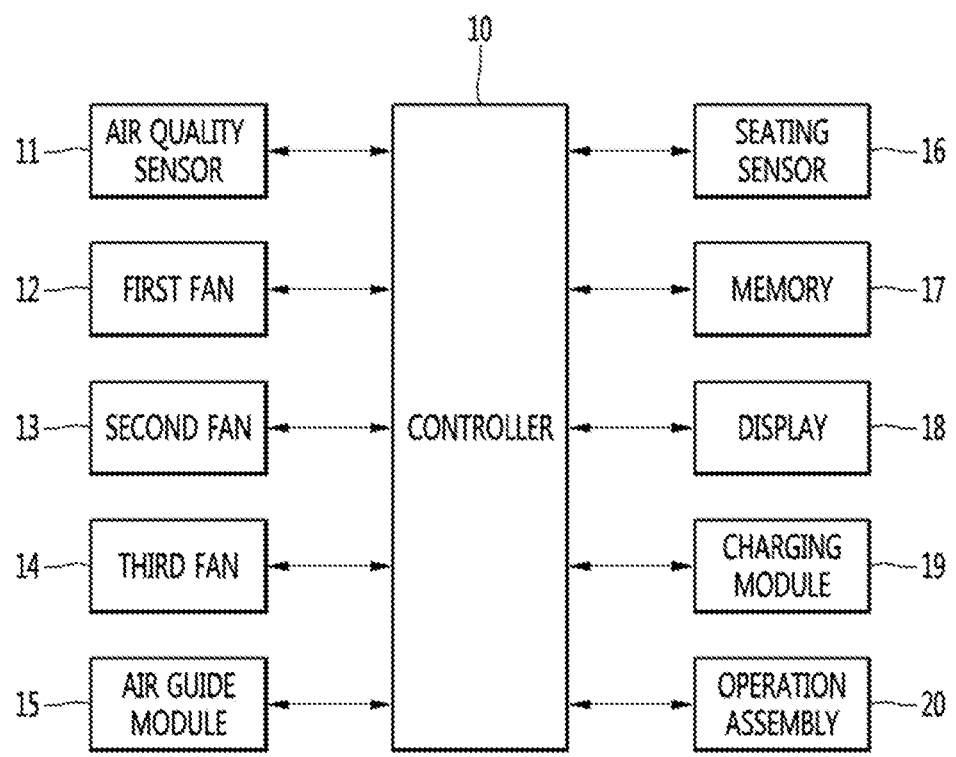
FIG. 8 is a block diagram of a main or base air purifier.

Referring to FIG. 8, devices of the base air purifier 1 may be designated with different reference numerals than previously used with reference to FIGS. 1-7. For example, the fans 106 of the base air purifier 1 shown in FIGS. 6-7 may be designated by reference numerals 12 through 14 in FIG. 8.

The base air purifier 1 may include a controller 10, which may operate each component shown in FIG. 8. The user may set the operation mode or state through a user interface of operation module 20 (e.g., touch screen). For example, the user may select the 24-hour air purifying mode described above using the user interface 20. A selection of the user may be stored in a memory 17. The controller 10 may receive an input of the user by reading necessary information from the memory 17 and operate the first, second and third fans 12, 13 and 14 accordingly. However, a number of fans in the base air purifier 1 is not limited to three.

In the 24-hour purifying state, the base air purifier 1 may be operated in a windless mode. In the windless mode, the first, second, and third fans 12, 13, and 14 may be turned off and/or operated at a low speed. The base air purifier 1 may be configured such that any combination of the first, second, and third fans 12, 13, and 14 may be operated in the windless mode. Clean air may be discharged at a low speed through microholes, and a direction of the clean air may be changed by an air guide module 15.

The implementation of the 24-hour purifying state and/or windless mode may be displayed on a display 18. After a certain period of time has elapsed, the display 18 may be turned off.

During the 24-hour purifying state, an air quality sensor 11 may continuously measure or sense air quality. When the measured air quality is bad (i.e., below a predetermined air quality range), the windless operation mode may be terminated and a rapid air purifying mode or other air purifying mode be operated.

If the portable air purifiers 2, 3 are not seated on the base air purifier 1 and and/or are determined to be far away from the base air purifier 1, and if the controller 10 also determines that the base air purifier 1 alone is insufficient to improve the sensed air quality, the display 18 may display a recommendation to the user to seat the portable air purifiers 2 and/or 3 on the base air purifier 1. If the portable air purifiers 2 and/or 3 are seated on the base air purifier 1, the controller 10 may control the portable air purifiers 2 and/or 3 based on the sensed air quality by the sensor 11.

Each of the base air purifier 1 and portable air purifiers 2 and 3 may have a communication module so that the base air purifier 1 and portable air purifiers 2 and 3 may communicate air quality data, seating information, etc. The base air purifier 1 may also have a seating sensor 16 to sense whether the portable air purifiers 2 and/or 3 are seated on the seating surface 104 of the base air purifier 1. There may be two seating sensors 16 corresponding to each portable air purifier 2 and 3. Seating information may be stored in the memory 17. The portable air purifiers 2 and/or 3 may be automatically operated based on information from the seating sensor 16 and the air quality sensor 11. When the air quality is improved (i.e., when the sensor 11 senses an air quality within the predetermined air quality range), the base air purifier 1 and/or any seated portable air purifiers 2 and/or 3 may be operated in the windless mode.

The controller 10 may control a charger or wireless charging module 19 to start charging the portable air purifier 2 or 3 when the seating sensor 16 indicates that the portable air purifier 2 or 3 is charged. A charge amount may be displayed on the display 18.

Figure 9:
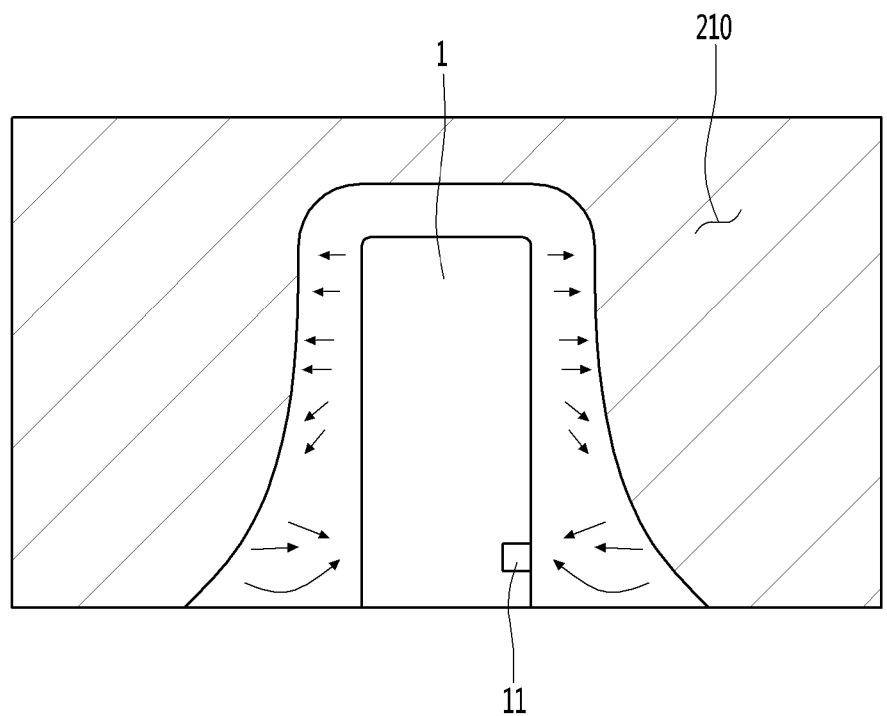
FIG. 9 is a view explaining an operation of a windless or quiet operation mode.
Figure 10:
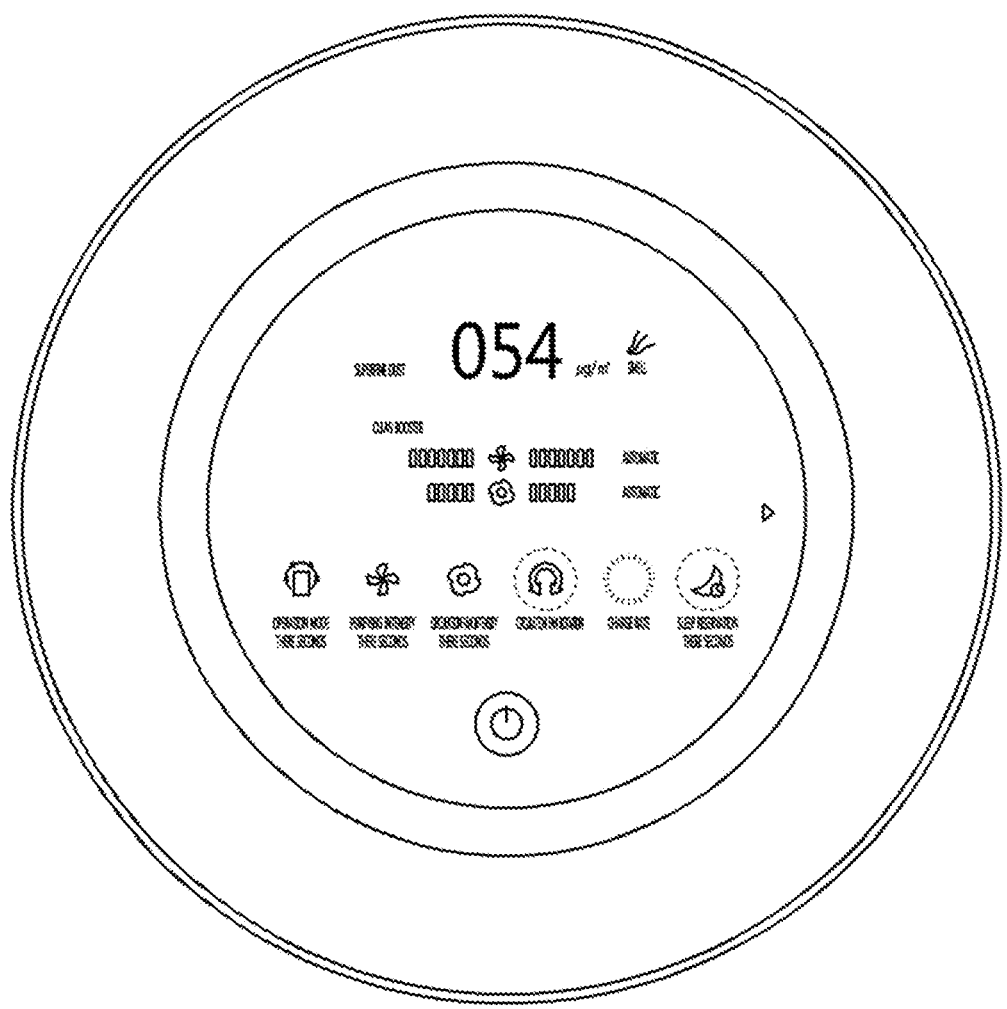
FIG. 10 is a plan view of a display of a portable air purifier.

Referring to FIGS. 6 and 9, the base air purifier 1 may be placed in a predetermined space or room and operated in the windless mode. During the windless mode, the base air purifier 1 may discharge clean air at a small flow rate through the microhole 107. As shown by the arrows, clean air may be discharged laterally (i.e., radially) through the microholes 107 at an upper portion of the air purifier 1, but may lose its directionality and be dispersed very soon after being discharged. As a result, clean air may not directly affect far areas or a region close to the closed wall 102, where air or other gas particles may move more freely.

A region further away from the base air purifier 1 may be referred to as a Brownian motion region 210 where gas, air, and foreign matter in the air may move according to Brownian motion and be freely diffused. The Brownian motion region 210 may be spaced a certain distance from the base air purifier 1 and may have a boundary line. Air discharged from the microholes 107 may enter the Brownian motion region 210 so as not to return the suction port 110. A flow rate of air around the suction port 110 may be larger than in the Brownian motion region 210, and a size of the Brownian motion region 210 may be reduced toward the suction port 110. The boundary line of the Brownian motion region 210 may be curved away from the suction port 110. Air supplied to the suction port 110 may come from the Brownian motion region 210. As an operation time elapses in the windless mode, more air may be cleaned and be dispersed freely to maintain a clean state of the room, while noise and power consumption may be reduced.

Referring to FIGS. 2-3, 5, and 10, the portable air purifiers 2 and 3 may be operated independently away from the base air purifier 1, and operating states may be displayed on the display 42 of the portable air purifier 2, 3. When the portable air purifier 2, 3 is placed on the seating surface 104 of the base air purifier 1, a charge (e.g., a charging amount or a charging rate) may also be displayed on the display 42 of the portable air purifier 2, 3.

This application is related to U.S. application Ser. No. 16/821,737 filed on Mar. 17, 2020 and Ser. No. 16/821,871 filed on Mach 17, 2020, the entire contents of which are hereby incorporated by reference.

Embodiments disclosed herein may perform various air cleaning operation corresponding to an indoor space by using a single air cleaning or purifying system provided with a plurality of air cleaners or purifiers. Industrial application may be highly expected.

Embodiments disclosed herein may provide an air cleaner or purifier and an air cleaning or purifying system which are capable of being operated in various modes or combinations in accordance with a residential environment of a customer by using a single air cleaning system. The air cleaner and air cleaning system may continuously maintain comfort in an indoor space regardless of a user's perception of air quality in order to improve a user's health. The air cleaner and air cleaning system may be conveniently handled by the user.

Embodiments disclosed herein may be implemented as an air cleaning or purifying system including at least one movable or portable air cleaner that is seated on an upper seating surface of a fixed or main air cleaner. The fixed air cleaner may be provided with a filter and a fan. The air cleaners may operate together while being movable or portable in an indoor space, increasing air cleaning efficiency.

The upper seating surface may be provided as a long surface extending in a horizontal (e.g., left and right) direction. At least two portable air cleaners may be placed on the upper seating surface and spaced apart in the left and right direction along the upper seating surface to perform a stronger air cleaning action. The portable air cleaners may operate in response to a sensed air quality or in response to a user's command.

A first wireless charging module may be provided on the upper seating surface and a second wireless charging module may be provided in the portable air cleaner. The second wireless charging module may correspond to the first wireless charging module, and the portable air cleaner may be wirelessly charged. A seating sensor may be provided near the first wireless charging module to sense a seating of the portable air cleaner, which may be automatically charged after being seated.

The fixed air cleaner may perform a quiet or windless operation mode in which a flow velocity of discharged air may be remarkably weak. The portable air cleaner may perform an air cleaning operation in various modes by performing a breeze or rapid purifying operation mode in which a flow velocity of the discharged air is high. The portable air cleaner may include a handle that is rotatably coupled to a body of the portable air cleaner for convenient handling.

Embodiments disclosed herein may be implemented as an air cleaner or purifier including an outer wall extending in a vertical direction, an ejection or discharge wall or portion in which a large number of small direct micro holes through which clean air discharged from the fan flows are formed and through which an outside of the outer wall may communicate with an inside of the outer wall. The micro holes may be formed at an upper portion of the outside wall.

Embodiments disclosed herein may provide a clean indoor atmosphere at all times by gradually performing an air purifying function when there is little or no noise so as not to be detected by a user. A main or base air purifier may have an upper seating surface that rests on a top of the outer wall and on which a portable air purifier may rest. A base may be provided below the outer wall. A bottom of the base may be a predetermined distance from a bottom of the outer wall. A filter may be placed in an inner space of the outer wall. At least one fan may be provided in the inner space of the outer wall above the filter to draw or suction air into the inner space of the outer wall.

The outer wall may have a long horizontal section in a first (i.e., a horizontal or length) direction. A large number of fans may be operated at a low speed inside of the outer wall so as to reduce noise while still purifying or filtering a large amount of air. The filter may include a side surface or portion corresponding to the outer wall and a bottom surface or portion corresponding to the base so that more air may be filtered in a unit time. The side portion and the outer wall may be spaced apart from each other to provide a first suction flow path, thereby utilizing the side portion of the filter.

The outer wall may include a closed wall and a discharge wall having a plurality of microholes formed therein. The closed wall may be provided under the discharge wall and above a suction port to space apart the microholes from the suction port. Clean air discharged through the microhole may not be suctioned back into the outer wall. The suction port may be provided between the lower end of the outer wall and the base at a position so that air may be suctioned through the bottom portion of the filter.

At least two fans may be installed or located in the inner space to suction a large amount of air. A wireless charging module may be provided at or below the upper seating surface so that a portable air purifier or other chargeable object placed on the upper seating surface may be charged wirelessly. At least one fan may be placed under the wireless charging module to effectively use the inner space. A seating sensor may be provided at a position adjacent to the wireless charging module so that a wireless charging operation may be automatically performed upon a seating of the portable air purifier.

There may be at least 100,000 microholes through which air may be discharged at a low flow rate so as to reduce noise. An upper portion of the discharge wall and a corner of the upper seating surface may be sealed to prevent leakage of clean air or to prevent dirty air from being discharged without first having passed through the filter. Each microhole may have a diameter of about 1 millimeter or less. Each microhole may have a diameter of about 1 micrometer or less.

Embodiments disclosed herein may be implemented as an air cleaner or purifier including an outer wall extending in a vertical direction and a discharge wall in which a plurality of holes having a diameter of 1 micrometer or less are formed. Clean air may be discharged through the plurality of holes by a fan. An inside and outside of the outside wall may communicate through the discharge wall. The discharge wall may be formed at an upper portion of the outer wall. A closed wall may be provided below the discharge wall to shield discharged air returning to the filter via a suction port, which may be provided immediately below the outer wall or on a bottom surface of the outer wall. Clean air discharged through the discharge wall may be prevented, by the closed wall, from being suctioned in again, improving an air cleaning efficiency.

The suction port may be provided below the closed wall to prevent clean air from being re-suctioned in. A Brownian motion area or region may be formed outside of the outer wall in which air may be dispersed. Air may be discharged from the discharge wall at a low flow rate, but may be suctioned in through the suction port at a higher flow rate, so the Brownian motion area may be further away from the suction port than from the discharge wall. A strong flow velocity through the suction port may keep the indoor space clean as a whole.

Embodiments disclosed herein may provide at least two air purifiers suitable for a plurality of diverse indoor spaces. The two air purifiers may be combined into a single air cleaning system, and may be separated into different rooms. Clean air may be supplied to a variety of indoor spaces in a manner that is suitable for each of the indoor spaces. Embodiments disclosed herein may be operated in a low-power-consumption mode and a low-air-volume windless operation mode so as to automatically maintain an indoor space in a clean state without user intervention.

Embodiments disclosed herein may be made in a size that may be used, carried, and/or transported by a person. Embodiments disclosed herein may be provided with a handle so that the user may conveniently move the air cleaner, increasing convenience and portability so that air purifiers may be used in a plurality of indoor spaces.

Embodiments disclosed herein may be implemented as an air purifier comprising a main air purifier and a first secondary air purifier. The main air purifier may have a top and a bottom with a fan and a filter provided between the top and the bottom. The top may have a seating surface. The first secondary air purifier may have a first fan, a first filter, and a first base configured to be seated on the seating surface of the main air purifier. The main air purifier may be longer in a horizontal direction than in a vertical direction. The first secondary air purifier may be longer in the vertical direction than in the horizontal direction.

A second secondary air purifier may have a second fan, a second filter, and a second base configured to be seated on the seating surface of the main air purifier. The seating surface of the main air purifier may have a first surface and a second surface adjacent to each other in the horizontal direction. The first surface of the seating surface may be configured to support the first secondary air purifier and the second surface of the seating surface may be configured to support the second secondary air purifier.

The main air purifier may include a first wireless charging module provided under the seating surface. The first secondary air purifier may include a second wireless charging module provided in the first base such that, when the first secondary air purifier is seated on the seating surface, the first and second wireless charging modules may be aligned.

The seating surface may include a seating sensor to sense whether the first secondary air purifier is seated on the seating surface. The seating sensor may be provided adjacent to the first wireless charging module.

The main air purifier may be configured to be operated in a quiet operation mode in which a flow velocity of discharged air is 0.25 m/s or less. The first secondary air purifier may be configured to perform a purifying mode in which a flow velocity of discharged air is greater than 0.25 m/s. The main air purifier may have a width in the horizontal direction to support the first secondary air purifier and another secondary air purifier.

Embodiments disclosed herein may be implemented as an air purifier comprising an outer wall extending in a vertical direction and forming an upper opening, an upper surface placed on top of the outer wall to cover the opening, the upper surface being configured to support a predetermined weight, a base provided below the outer wall such that a top of the base, a bottom of the upper surface, and an inner surface of the outer wall form an inner space, a filter provided in the inner space to filter foreign matter from air, and at least one fan provided in the inner space above the filter. An upper portion of the outer wall may include a plurality of holes having a diameter of one millimeter or less through which filtered air is discharged from the inner space to an outside of the outer wall.

The outer wall may be at least three times longer in a horizontal direction than in a vertical direction. The filter may include a side section to filter air flowing in a horizontal direction and a bottom section to filter air flowing in the vertical direction. An outer surface of the side section of the filter and the inner side of the outer wall may be spaced apart from each other to allow air to flow through an air intake provided at the bottom of the outer wall.

The plurality of holes may be positioned a predetermined distance above the air intake. The at least one fan may include two fans provided in the inner space and configured to discharge air upward. The at least one fan may include three fans provided adjacent to each other in a horizontal direction in the inner space.

A wireless charging module may be provided under the upper surface to charge a portable air purifier seated on the upper surface. The fan may be provided below the wireless charging module.

A seating sensor may be provided at a position adjacent to the wireless charging module. The seating sensor may be configured to detect whether the portable air purifier is seated on the upper surface.

At least 100,000 holes may be formed in the upper portion of the outer wall. A length and width of a bottom of the base may be equal to a length and width of the bottom of the outer wall. A length and width of a top of the base may be less than a length and width of the bottom of the outer wall.

Embodiments disclosed herein may be implemented as an air purifier comprising a main air purifier and a secondary air purifier. The main air purifier may have a side wall forming a first inner space, a first fan provided in the first inner space, a first filter provided in the first inner space, a suction port provided at a bottom of the side wall through which air is suctioned, and a plurality of first holes provided a predetermined distance above the suction port through which air is discharged. The secondary air purifier may have a case forming a second inner space, a second fan provided in the second inner space, a second filter provided in the second inner space, a plurality of second holes formed in a lower section of the case through which air is suctioned, and a discharge port provided in an upper section of the secondary air purifier through which air is discharged. A diameter of the smallest second hole may be larger than a diameter of the first holes. The secondary air purifier may have a prescribed weight to push down a surface on top of the main air purifier when the secondary air purifier is placed on the surface.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air purifier, comprising:
a main air purifier having a top and a bottom with a fan and a filter provided between the top and the bottom, the top having a seating surface; and
a first secondary air purifier having a first fan, a first filter, and a first base configured to be seated on the seating surface of the main air purifier,
wherein the main air purifier is longer in a horizontal direction than in a vertical direction, and the first secondary air purifier is longer in the vertical direction than in the horizontal direction,
wherein the main air purifier includes at least two of the fans disposed in a horizontal direction.

2. The air purifier of claim 1, further comprising a second secondary air purifier having a second fan, a second filter, and a second base configured to be seated on the seating surface of the main air purifier, wherein the seating surface of the main air purifier has a first surface and a second surface adjacent to each other in the horizontal direction, the first surface of the seating surface being configured to support the first secondary air purifier and the second surface of the seating surface being configured to support the second secondary air purifier.

3. The air purifier of claim 1, wherein the main air purifier includes a first wireless charging module provided under the seating surface and the first secondary air purifier includes a second wireless charging module provided in the first base such that, when the first secondary air purifier is seated on the seating surface, the first and second wireless charging modules are aligned.

4. The air purifier of claim 3, wherein the seating surface includes a seating sensor to sense whether the first secondary air purifier is seated on the seating surface, the seating sensor being provided adjacent to the first wireless charging module.

5. The air purifier of claim 1, wherein the main air purifier is configured to be operated in a quiet operation mode in which a flow velocity of discharged air is a first velocity, and the first secondary air purifier is configured to perform a purifying mode in which a flow velocity of discharged air is a second velocity which is greater than the first velocity.

6. The air purifier of claim 1, wherein the main air purifier has a width in the horizontal direction to support the first secondary air purifier and another secondary air purifier.

7. An air purifier, comprising:
a outer wall extending in a vertical direction and forming an upper opening;
an upper surface placed on top of the outer wall to cover the opening, the upper surface being configured to support a predetermined weight;
a base provided below the outer wall such that a top of the base, a bottom of the upper surface, and an inner surface of the outer wall form an inner space;
a filter provided in the inner space to filter foreign matter from air; and
at least one fan provided in the inner space above the filter, wherein an upper portion of the outer wall includes a plurality of holes having a diameter of one millimeter or less through which filtered air is discharged from the inner space to an outside of the outer wall.

8. The air purifier of claim 7, wherein the outer wall is at least three times longer in a horizontal direction than in a vertical direction.

9. The air purifier of claim 7, wherein the filter includes:
a side section to filter air flowing in a horizontal direction; and
a bottom section to filter air flowing in the vertical direction.

10. The air purifier of claim 9, wherein an outer surface of the side section of the filter and the inner side of the outer wall are spaced apart from each other to allow air to flow through an air intake provided at the bottom of the outer wall.

11. The air purifier of claim 9, wherein the plurality of holes are positioned a predetermined distance above the air intake.

12. The air purifier of claim 7, wherein the at least one fan includes two fans provided in the inner space and configured to discharge air upward.

13. The air purifier of claim 7, wherein the at least one fan includes three fans provided adjacent to each other in a horizontal direction in the inner space.

14. The air purifier of claim 7, further comprising a wireless charging module provided under the upper surface to charge a portable air purifier seated on the upper surface.

15. The air purifier of claim 14, wherein the fan is provided below the wireless charging module.

16. The air purifier of claim 14, further comprising a seating sensor provided at a position adjacent to the wireless charging module, the seating sensor being configured to detect whether the portable air purifier is seated on the upper surface.

17. The air purifier of claim 7, wherein at least 100,000 holes are formed in the upper portion of the outer wall.

18. The air purifier of claim 7, wherein a length and width of a bottom of the base are equal to a length and width of the bottom of the outer wall, and a length and width of a top of the base are less than a length and width of the bottom of the outer wall.

19. An air purifier, comprising:
a main air purifier having a side wall forming a first inner space, a first fan provided in the first inner space, a first filter provided in the first inner space, a suction port provided at a bottom of the side wall through which air is suctioned, and a discharge wall having a plurality of first holes provided a predetermined distance above the suction port through which air is discharged; and
a secondary air purifier having a case forming a second inner space, a second fan provided in the second inner space, a second filter provided in the second inner space, a plurality of second holes formed in a lower section of the case through which air is suctioned, and a discharge port provided in an upper section of the secondary air purifier through which air is discharged, wherein a diameter of the smallest second hole is larger than a diameter of the first holes.

20. The air purifier of claim 19, wherein a closed wall is provided between the discharge wall and the suction port, and the closed wall provides a sufficient distance between the discharge wall and the suction port to prevent or reduce air discharged out of the discharge wall from flowing back to the suction port.

* * * * *